US005328052A

United States Patent [19]
Kizilos

[11] Patent Number: 5,328,052
[45] Date of Patent: Jul. 12, 1994

[54] EASY LID DISPENSER

[75] Inventor: Mark A. Kizilos, Los Angeles, Calif.
[73] Assignee: Ezalid, Santa Monica, Calif.

[21] Appl. No.: 86,301
[22] Filed: Jul. 6, 1993
[51] Int. Cl.[5] ........ B65G 59/00
[52] U.S. Cl. ........ 221/42; 221/231
[58] Field of Search ........ 221/42, 43, 36, 231, 221/277

[56] References Cited

U.S. PATENT DOCUMENTS

| | | | |
|---|---|---|---|
| 1,466,492 | 8/1923 | Stiriss | 221/42 |
| 1,754,957 | 4/1930 | Lorentzen | 221/42 |
| 2,396,411 | 3/1946 | Cameron | 221/231 |
| 2,533,932 | 12/1950 | Hayek | 221/42 |
| 3,163,327 | 12/1964 | Maxwell | 221/277 |
| 3,220,605 | 11/1965 | Casey | 221/231 |
| 3,674,160 | 7/1972 | Gutowski | 221/277 |

FOREIGN PATENT DOCUMENTS 1449167 11/1968 Fed. Rep. of Germany ...... 221/277

*Primary Examiner*—H. Grant Skaggs

[57] ABSTRACT

A dispenser for storing and sequentially dispensing flexible, disposable lids for cups such as those used with soft drinks, coffee, soups, or the like from a nested stack of lids held in an elongated container by a dispensing rod disposed across one side of its lower end. The dispensing rod projects through a wall of the container and is attached to a turning handle. In resting position, an edge portion of the circular surface of the lowermost lid sits on the dispensing rod, a lip portion of which extends tangentially outward and clockwise. When rotated, the lip portion of the rotatable dispensing rod engages a portion of the outer wall of the lowermost lid, slightly flexing the lid so that it becomes separated from the stack and drops into a catch tray.

4 Claims, 4 Drawing Sheets

EASY LID DISPENSER

FIELD OF INVENTION

The present invention relates to a dispenser for storing and serially dispensing flexible, disposable lids for cups such as those used with soft drinks, coffee, soups, and the like from a nested stack of lids.

BACKGROUND ART

Dispensers of many sorts are used by establishments which employ disposable containers such as paper and Styrofoam cups. While dispensers for cups are found in many service settings, dispensers for lids have not come into common use. Disposable lids have generally been presented for use in open, horizontal trays. In such trays, the elongated stack of lids generally rests with its longitudinal axis disposed horizontally within the tray. This presentation makes it difficult to grasp and separate a single lid from the stack. The consumer often must use two hands to obtain a single lid. This process entails the touching and possible soiling or contamination of the remaining lids in the tray. In addition, with frequent handling of the lids, the tray often becomes cluttered with loose lids that have been dislodged from the stack. This messy presentation further impedes the efficient removal of a single lid from the tray. Furthermore, when presented in such open trays, various dirt or food particles, fluids and the like may be accidentally introduced into the tray rendering the entire contents unusable.

In attempts to overcome the problems of open, horizontal trays, some establishments have adopted partially open vertical cylinders or other upright containers. While the potential for accidental spoilage of the entire stack is somewhat reduced by the use of a partially-open, vertical container, the potential for contamination is not substantially reduced. Even when the stack is in such a container with its longitudinal axis disposed vertically within the container so that the top or bottom lid is in a readily hand engageable position, there is no means of preventing the incidental handling and contamination of other lids in the stack.

The lid dispensing device proposed in U.S. Pat. No. 4,643,334 to Steele (1987) facilitates the removal of lids from a partially open vertical container, but does not substantially overcome the problem of contamination mentioned with respect to such containers. In addition, it is limited in application to the dispensing of lids constructed in such a manner that they do not form a substantially interlocked stack. A stack of substantially interlocked lids prevent horizontal movement of individual lids which can only be efficiently removed with a upward or downward motion of the top or bottom lid. This motion is generally difficult to achieve with a partially open vertical container and cannot be efficiently achieved with the device of the aforementioned patent. Because the Steele device can only be used to remove lids through a horizontal motion, it cannot be used for dispensing lids for many types of Styrofoam cups. These cup lids nest in a substantially interlocking stack and are thus unsuitable for use with the Steele device.

The aforementioned problems with the storage and presentation for use of disposable lids in either horizontal or vertical trays often lead establishments to keep the lids behind a service counter. When this practice is adopted, the lids must be dispensed to ultimate consumers by service personnel. This consumes employee time, increases the duration of the service transaction and still poses some contamination and spoilage problems.

Several devices have been proposed to accomplish the serial dispensing of lids from a largely closed container with a dispensing opening. See for example, U.S. Pat. Nos. 5,131,562 to Brown (1992), 5,012,952 to Franz (1991) and 5,038,969 to Berger (1991). However, all of these patents are limited for use with lids of very specific construction. The Brown and Franz devices each rely on the outward flare or flange of a lid to accomplish the dispensing function. Such a flare is frequently not employed in lids designed for use with paper cups. When such non-flared lids with substantially straight walls are nested, they present a stack with a primarily smooth, straight and uninterrupted surface. These characteristics are apt to make the Brown and Franz devices ineffective in dispensing such lids.

The device proposed for lid dispensing by U.S. Pat. No. 5,038,969 issued to Berger is limited to the dispensing of lids with a circular top wall and a downwardly extending annular flange integral with the top wall. In addition, this device is sufficiently complex both in the number of parts and the specifications of their interworkings so as to make its manufacture expensive relative to the present invention.

SUMMARY OF THE INVENTION

An object of this invention is to provide a dispenser for storing and sequentially dispensing flexible, disposable lids which addresses the problems aforementioned, and others.

In accordance with the present invention, the lid dispenser comprises an elongated container defined by four walls with an opening on top which may be covered (not shown in figures) and an opening on the bottom for dispensing of the lids. Lids may be loaded into the dispenser through the top, through a removable wall or other means as will be obvious to those fluent in the art of container design.

The stack of lids in the elongated container rests at one side on top of the rotatable dispensing rod, and hangs down on the diametrically opposite side. With each turn of the rotatable dispensing rod in a clock-wise fashion, one lid is released from the stack and dropped through the open dispensing end of the elongated container into a catch tray.

For effective dispensing of all the disposable lids in the stack, a weight can be placed on top of the lids with an attached till sliding vertically along a guide in a wall of the elongated container.

The novel features that are considered characteristic of this invention are set forth with particularity in the appended claims. The invention will best be understood from the following description when read in conjunction with the accompanying drawings.

DETAILED DESCRIPTION OF THE INVENTION

Figure 1:
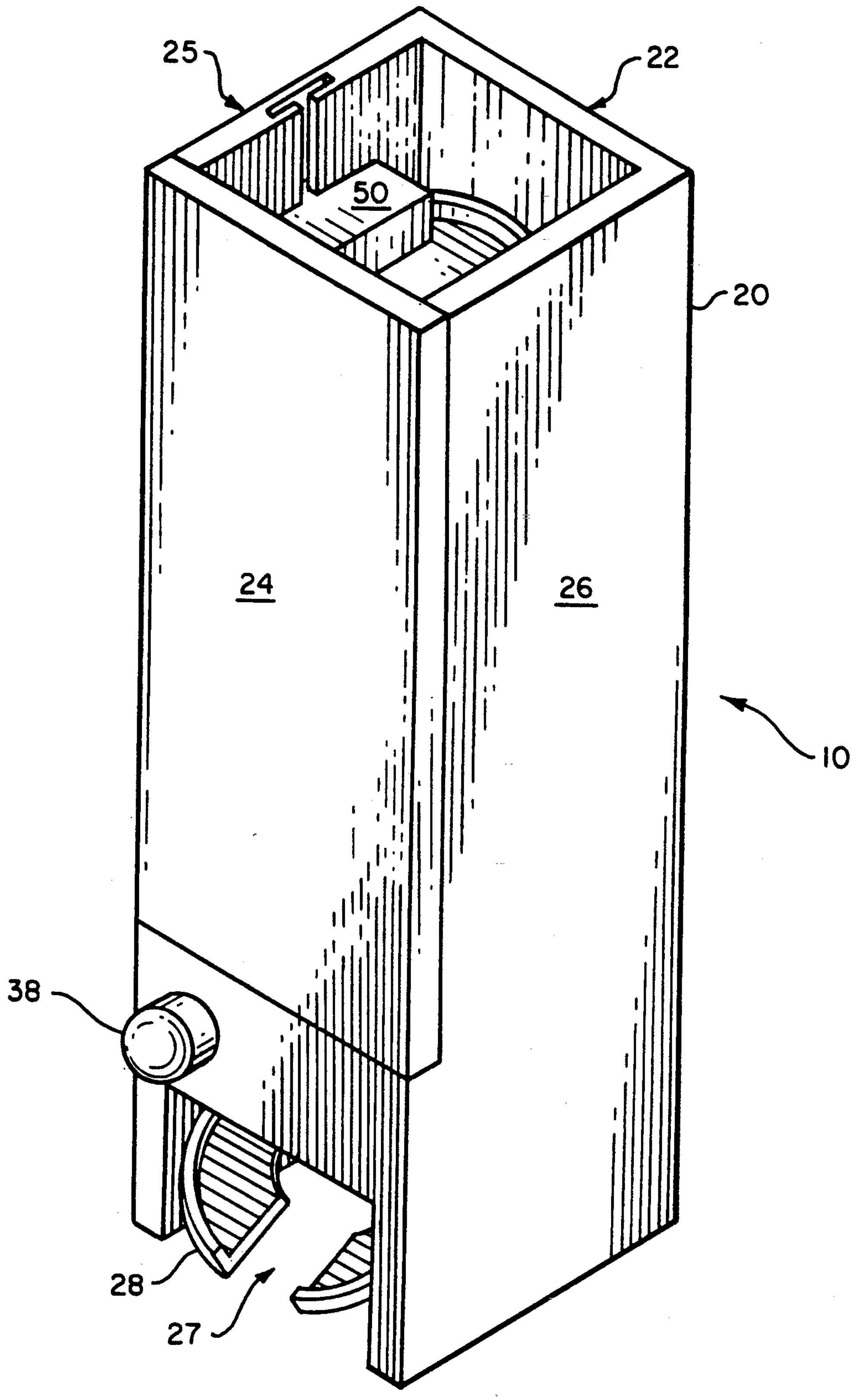
FIG. 1 is a perspective view of the lid dispenser in accordance with the present invention.
Figure 2:
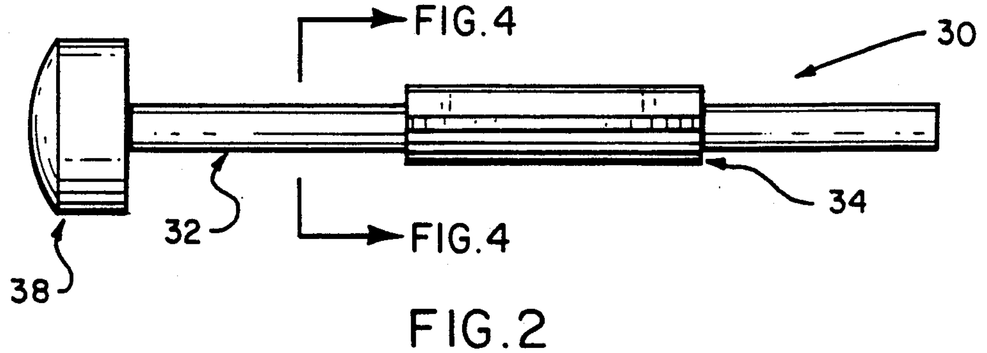
FIG. 2 is an enlarged side view of the rotatable dispensing rod.
Figure 3:
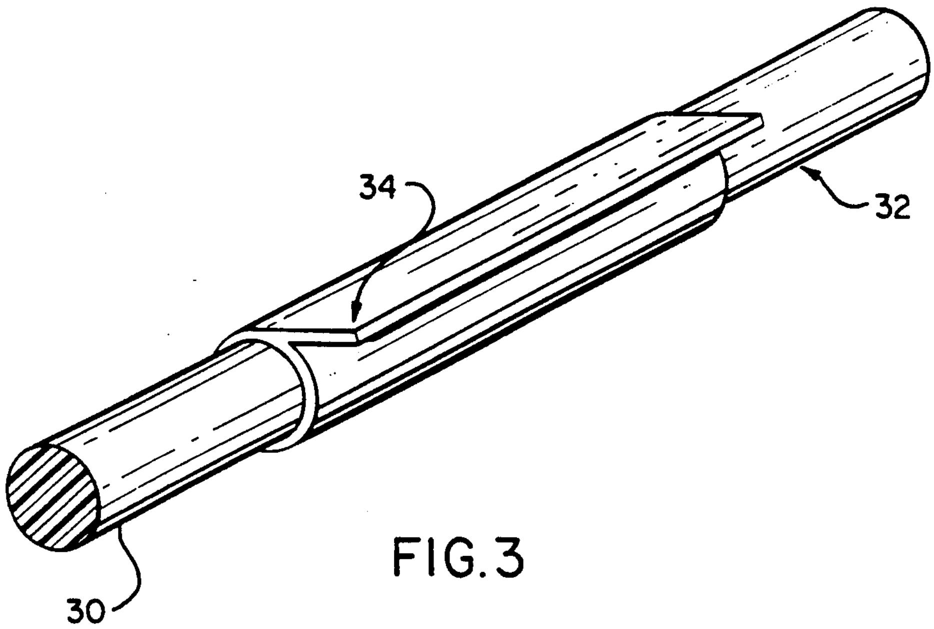
FIG. 3 is an enlarged perspective view of the rotatable dispensing rod.
Figure 4:
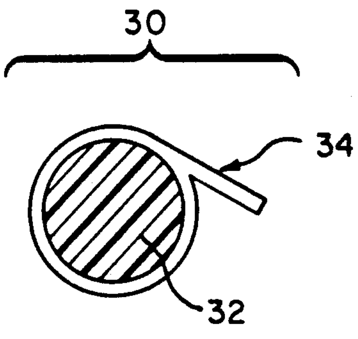
FIG. 4 is an enlarged cross sectional view of the rotatable dispensing rod.
Figure 5:
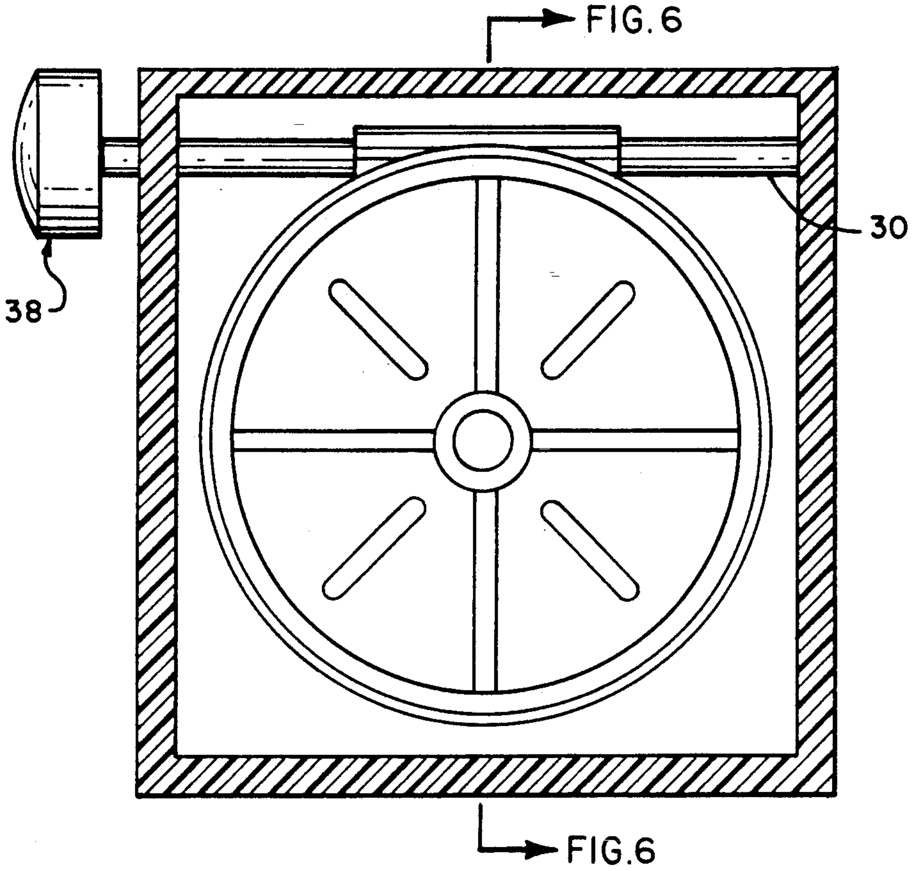
FIG. 5 is an enlarged plan view of the lid dispenser in accordance with the present invention.

Referring to the FIG. 1, a lid dispenser 10 of the present invention is shown comprising an elongated container 20 defined by a rear wall 22, a front wall 24, a left side wall 25 and a right side wall 26. The elongated container 20 also has an open dispensing end 27 and a catch tray 28. FIG. 2 and FIG. 3 show a rotatable dispensing rod 30 with an elongated cylindrical portion 32 having a lip portion 34 extending tangentially outward as shown more closely in an end view, FIG. 4. FIG. 5 shows the rotatable dispensing rod 30 is connected at one end to the rear wall 22 and extends through the front wall 24 where it is attached to a turning means 38 so as to allow for rotational movement along the axis of the dispensing rod 30 with the lip portion 34 extended in a clock-wise fashion as viewed from the turning means end.

Figure 6:
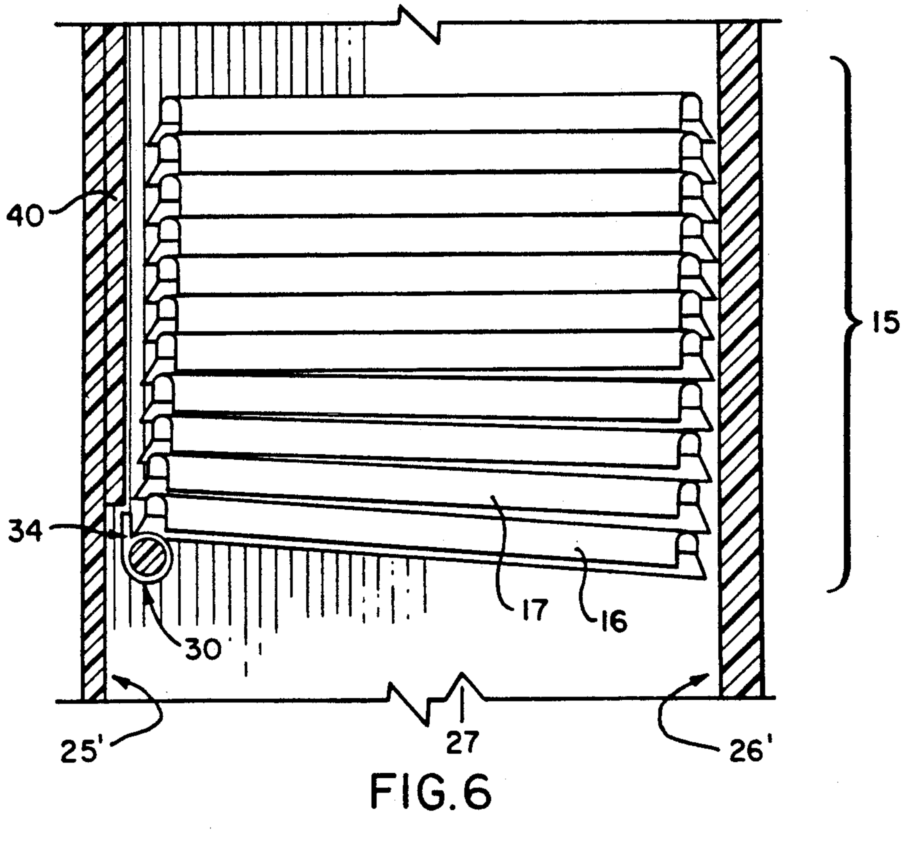
FIG. 6 is an enlarged cross sectional view taken along line 6—6 of FIG. 5 of a coaxial stack of lids resting within the elongated container on the rotatable dispensing rod.
Figure 7:
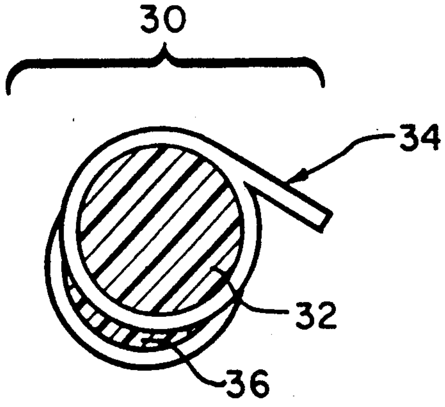
FIG. 7 is a cross section of the rotatable dispensing rod equipped with a ridge.

A coaxial stack of lids 15 is shown in FIG. 6, resting at one end on top of the rotatable dispensing rod 30 and slightly hanging downward at the other end. A positioning means 40 affixed to inner left side wall 25' above the rotatable dispensing rod 30 holds the lids against inner right side wall 26' and in place for engagement by the lip portion 34. With a clock-wise rotation of the rotatable dispensing rod 30 as viewed from the turning means end, the lowermost lid 16 is separated from the next lower most lid 17 and pushed against the inner right side wall 26' to a point that it is no longer in a nested relationship with the next lowermost lid 17. Simultaneously, the lowermost lid 16 is pushed downward and toward the open dispensing end 27 (refer to FIG. 1). The lowermost lid 16 is then dispensed through the open dispensing end 27 and onto the catch tray 28. As shown in FIG. 7, the rotatable dispensing rod 30 can also be equipped with a ridge 36 along the surface of the elongated cylindrical portion 32, opposite the point of tangency of the lip portion 34 for assisting in the positioning of the lowermost lid 16 immediately prior to engagement of the lip portion 34 so as to allow for more accurate and reliable singular dispensing of the lids from the coaxial stack of lids 15.

Figure 8:
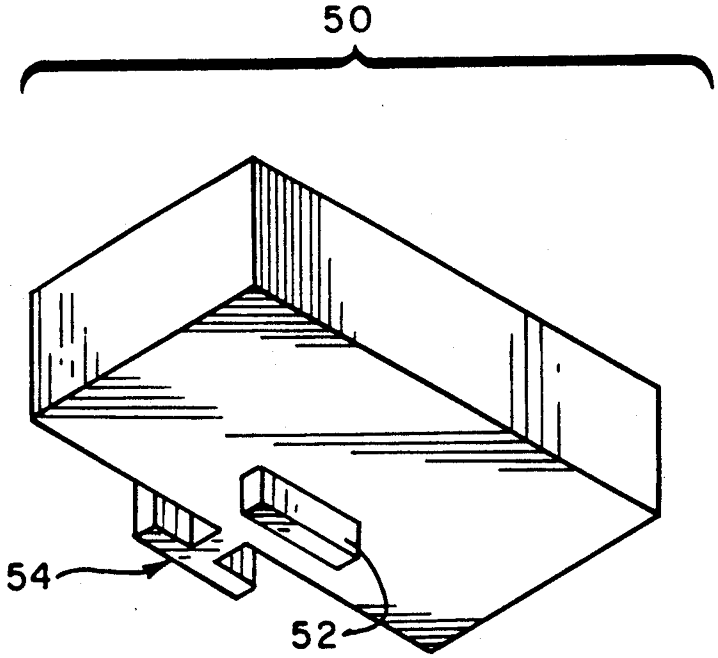
FIG. 8 is a perspective view of a weight.

Referring now to FIG. 8, a weight 50 having a tongue 52 and a till 54 can also be added to the top of the coaxial stack of lids 15 such that the till 54 slides vertically along a guide attached to the inner left side wall 25' of the elongated container 20 (See FIG. 1). This weight aids in the dispensing of all the lids in the coaxial stack of lids 15.

Although particular embodiments of the invention have been described and illustrated herein, it is recognized that modifications and variations may readily occur to those skilled in the art. Consequently, it is intended that the claims be interpreted to cover such modifications and variations.

I claim:

1. A lid dispenser for serially dispensing lids from a vertical coaxial stack of nested lids comprising, an elongated container having an open dispensing end, and a rotatable dispensing rod near said open dispensing end and positioned underneath and to one side of said coaxial stack of nested lids said rotatable dispensing rod having an elongated cylindrical portion, a lip portion extending tangentially outward from a surface thereof, and a turning means affixed to one end of said dispensing rod, said one end extending from one of two opposite sides of said elongated container the arrangement of the stack of nested lids and the rotatable dispensing rod being such that as the rod rotates the lip portion of the rod engages one side of the lower most lid of the stack and pushes the lower most lid against an inner side of the container and then simultaneously pushes the lower most lid downwardly into the dispensing end of the container whereby the lower most lid is separated from the remainder of the stack.

2. A device as defined in claim 1, wherein said elongated container includes positioning means positioned along the inside of said elongated container.

3. A device as defined in claim 1, wherein said elongated cylindrical portion of said rotatable dispensing rod includes a ridge along the axis of said cylindrical portion positioned opposite a point of tangency of said lip portion with said rotatable dispensing rod.

4. A device as defined in claim 1, further comprising a weight connected movably to an inner side wall of said elongated container, having a tongue connected to one side and a till affixed to one end of said weight.

* * * * *